F. A. CANON.
PRODUCING CATALYTIC REACTIONS IN THE VAPOR PHASE.
APPLICATION FILED APR. 18, 1919.
1,355,105.  Patented Oct. 5, 1920.
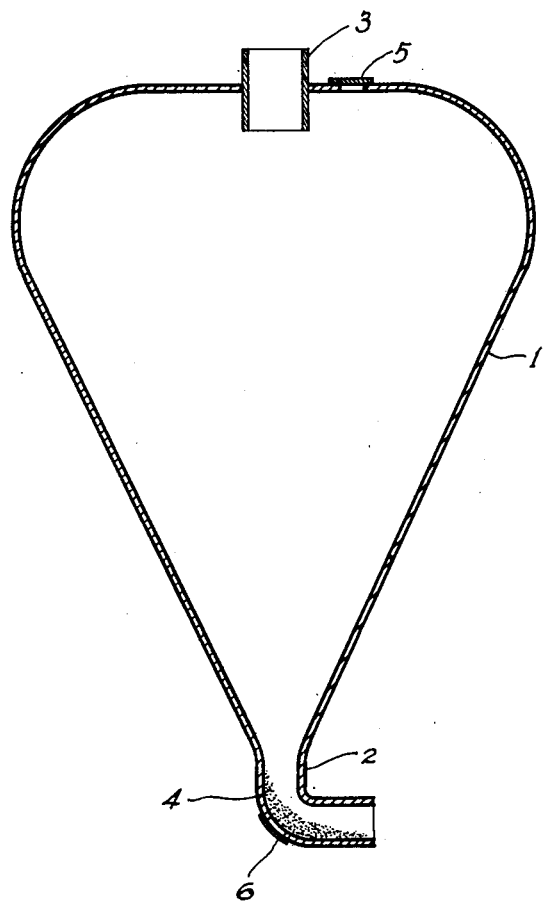
INVENTOR
Frank A. Canon
BY
Chas. W. Mortimer
ATTORNEY

UNITED STATES PATENT OFFICE.

FRANK A. CANON, OF GRANTWOOD, NEW JERSEY, ASSIGNOR TO THE BARRETT COMPANY, A CORPORATION OF NEW JERSEY.

PRODUCING CATALYTIC REACTIONS IN THE VAPOR PHASE.

1,355,105. Specification of Letters Patent. Patented Oct. 5, 1920.

Application filed April 18, 1919. Serial No. 291,113.

*To all whom it may concern:*

Be it known that I, FRANK A. CANON, a citizen of the United States, residing at Grantwood, in the county of Bergen and State of New Jersey, have invented certain new and useful Improvements in Producing Catalytic Reactions in the Vapor Phase, of which the following is a specification.

This invention relates to new and useful improvements in producing chemical reactions wherein catalysts are used. It relates more particularly to catalytic reactions between vapors or gases or both, wherein the catalyst in finely divided form is distributed in the dispersed phase throughout the substances which act as the dispersing medium.

One of the objects of the invention is to promote chemical reactions of the nature specified in such a manner that the heat control can be easily maintained.

Another object is to provide extensive contact surface and an easily regulatable time of active contact between the catalyst and the reacting substances.

Another object is to make provision for readily replacing or renewing the catalyst when it has become exhausted or has lost its potency.

Other objects and advantages of the invention will be obvious as the description proceeds.

In practising this invention the substances, between which the reactions are to be promoted, are passed in the vapor phase or gaseous state into contact with the catalyst, which is in the form of small particles, at such a velocity that the catalyst is picked up and swept along with the substances. If desirable, the catalyst may be separated from the products of the reaction by filtration or it may be removed from suspension by magnetic or electrical precipitation or it may be precipitated by decreasing its velocity and then returned to the reacting zone for further use. Many processes for catalytic chemical reactions depend upon the use of a catalyst mass which is fixed in position and whenever such reactions take place with a considerable change in heat potential, the temperature control must be accomplished by radiating or conducting the required heat to or from it over comparatively great distances. In this present invention a much more delicate control of temperature is possible since both the catalyst and reaction mixture are in rapid motion during their entire period of active contact and are in relative motion with respect to each other in passing through the reaction zone so that a much more uniform temperature is obtained than has been possible with the prior processes.

Many different sorts of apparatus may be used in carrying out this process as it is necessary for the purposes of this invention merely to provide a proper reaction zone in which the reaction will take place to the desired extent and then cease without causing a decomposition of the product or products which it is desired to obtain from the reaction. This may be done either by separating the catalyst from the reaction gases at the proper instant as already stated, or the catalyst with the reaction gases may be passed into an unreactive zone as soon as the proper length of time of active contact has expired.

The invention will be understood from the accompanying drawing which is a sectional view, showing one sort of device by means of which the process may be practised. This device is shown for illustrative purposes. It will be obvious that the desired reactions can be carried out in other apparatus without departing from the spirit and scope of the invention.

In the drawing, reference character 1 designates a tapering vessel having an inlet 2 and an outlet 3 for the gases. The vessel 1 may be partly or wholly immersed in a cooling or heating medium, if desired, or it may be surrounded with heating or cooling coils, or heating or cooling coils or grids may be introduced inside of vessel 1. Covered openings 5 and 6 are provided in vessel 1 through which the catalyst 4, in comminuted form, may be introduced and withdrawn.

The operation is as follows: The catalyst, in a pulverized, powdered, or granular form, is placed in the lower portion of the vessel 1. The gaseous reaction mixture, at a proper temperature for reaction is introduced through inlet 2 where it is preferably given a swirling motion, and picks up the particles of catalyst whereupon the desired reaction takes place. When the mixture reaches the widened portions of the vessel 1, its velocity is decreased so that the particles of catalyst in solid form are deposited upon the sloping sides of the vessel 1 and drift down to the lower portion where they may again be taken up by the incoming mixture. The gaseous mixture at the upper portion of the vessel 1, which may be substantially or entirely freed from catalyst, leaves vessel 1 at outlet 3. The vessel 1 may be heated or cooled internally or externally as desired by the heating or cooling medium so that the catalyst and reaction mixture is kept at the proper temperature.

When the catalyst becomes depleted by losses or becomes coated with deposits from the reaction mixture it may be withdrawn through opening 6 and a new supply introduced through opening 5 without interfering seriously with the operation. Instead of the catalyst itself being in comminuted solid form it may be deposited upon a carrier, such as pumice, asbestos, infusorial earth, etc, which is in a fine state of subdivision. The division of the catalyst into fine particles provides a large contact surface in proportion to the volume of the catalyst, and the movement of the catalyst with the mixture provides a longer time of active contact per particle of catalyst than would be obtainable with a stationary catalyst. The time of active contact can be made to vary by the suddenness with which the reduction in velocity takes place, which is dependent upon the angle of taper of the walls of vessel 1. It may also be controlled by passing the products of the reaction along with the entrained catalyst into a zone at which the temperature is unsuitable for further reaction. For purposes of explanation the time of active contact may be defined as that time in which the catalyst and reaction mixture are in contact at substantially the proper temperature to produce desirable products.

This invention provides a convenient way of regulating the temperature of the catalyst, and secures a very uniform temperature of the same since there are no thick layers of catalyst in contact with heating or cooling surfaces during the reaction period, and no particles of the catalyst in the desired reaction zone becomes so overheated or so much cooled that they lose their efficacy in the process.

What is claimed and desired to be secured by Letters Patent is:

1. The process of producing catalytic reactions which comprises producing chemical reactions in gas mixtures by suspending a catalyst in circulatory motion therein.

2. The process of producing catalytic reactions which comprises providing a finely divided catalyst in a reaction zone, passing a gaseous reaction mixture through said reaction zone in which it possesses different velocities in different portions of the same, whereby small particles of a catalyst are picked up at one portion of said zone and deposited at another.

3. The process of producing catalytic reactions which comprises providing a finely divided catalyst in a reaction zone, passing a gaseous reaction mixture through said reaction zone in which it possesses different velocities in different portions of the same, whereby small particles of a catalyst are picked up at one portion of said zone and returned to the portion where they are again picked up.

4. The process of producing catalytic reactions which comprises providing a finely divided catalyst in a reaction zone, passing a gaseous reaction mixture through said reaction zone in which it possesses different velocities in different portions of the same, whereby small particles of a catalyst are picked up at one portion of said zone and returned to the portion where they are again picked up, the temperature of said particles and gases being controlled.

5. The process of producing catalytic reactions which comprises entraining particles of a catalyst along with a rapidly moving gaseous reaction mixture and decreasing the velocity of said mixture immediately after said catalyst particles are entrained whereby said particles are deposited.

6. The process of producing catalytic reactions which comprises entraining particles of a catalyst along with a gaseous reaction mixture which is rapidly moving in a vertical direction, whereby the desired reaction takes place and separating the catalyst particles therefrom after the desired time of active contact has been maintained by decreasing the velocity of said reaction mixture.

7. The process of producing catalytic reactions which comprises picking up particles of a catalyst with a rapidly moving gaseous reaction mixture, which mixture is caused to decrease in velocity immediately after said particles are picked up, and automatically returning said particles by gravity to the vicinity of the place where they were picked up after they have traveled some distance with said gaseous mixture.

In testimony whereof I affix my signature.

FRANK A. CANON.